(12) United States Patent  (10) Patent No.: US 8,749,715 B2
Kataoka et al.                (45) Date of Patent:     Jun. 10, 2014

(54) INFORMATION PROCESSING SYSTEM AND INFORMATION PROCESSING METHOD

(75) Inventors: Hideo Kataoka, Tokyo (JP); Hideyuki Toma, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/608,416

(22) Filed: Sep. 10, 2012

(65) Prior Publication Data

US 2013/0176491 A1    Jul. 11, 2013

(30) Foreign Application Priority Data

Jan. 6, 2012  (JP) .................................. 2012-001638

(51) Int. Cl.
    H04N 5/44        (2011.01)
(52) U.S. Cl.
    USPC .......................................... 348/734; 348/552
(58) Field of Classification Search
    USPC .................. 348/734, 552, 553; 345/173, 157;
                                          455/420, 556.1, 556.2
    See application file for complete search history.

(56) References Cited

U.S. PATENT DOCUMENTS

2006/0149811 A1    7/2006  Bennett et al.
2010/0165217 A1*   7/2010  Jacob ............................ 348/734
2011/0074545 A1    3/2011  Yamada et al.
2012/0015641 A1    1/2012  Azuma et al.
2012/0162536 A1*   6/2012  Sibilsky et al. ............... 348/734

FOREIGN PATENT DOCUMENTS

| JP | 11-073275 | 3/1999 |
|---|---|---|
| JP | 2002-262206 | 9/2002 |
| JP | 2003-061163 | 2/2003 |
| JP | 2005-102060 | 4/2005 |
| JP | 2010-259046 | 11/2010 |
| JP | 2011-77671 | 4/2011 |
| WO | WO 2008-527800 | 7/2008 |

OTHER PUBLICATIONS

Japanese Patent Application No. 2012-001638, First Office Action, mailed Nov. 27, 2012, (with English Translation).
Japanese Patent Application No. 2012-001638, First Office Action, mailed Apr. 16, 2012, (with English Translation).

* cited by examiner

*Primary Examiner* — Michael Lee
(74) *Attorney, Agent, or Firm* — Blakely, Sokoloff, Taylor & Zafman LLP

(57) ABSTRACT

According to one embodiment, an information processing system includes a television receiver, a mobile terminal, and an interface. The terminal includes a wireless controller configured to acquire a state signal from the television receiver and to supply a control signal to the television receiver. The interface is provided in the television receiver or the terminal and configured to convert a state acquisition request and a control signal from the controller into a request and a signal which can be detected by the television receiver and to convert a state signal from the television receiver into a state signal which can be detected by the controller.

20 Claims, 8 Drawing Sheets

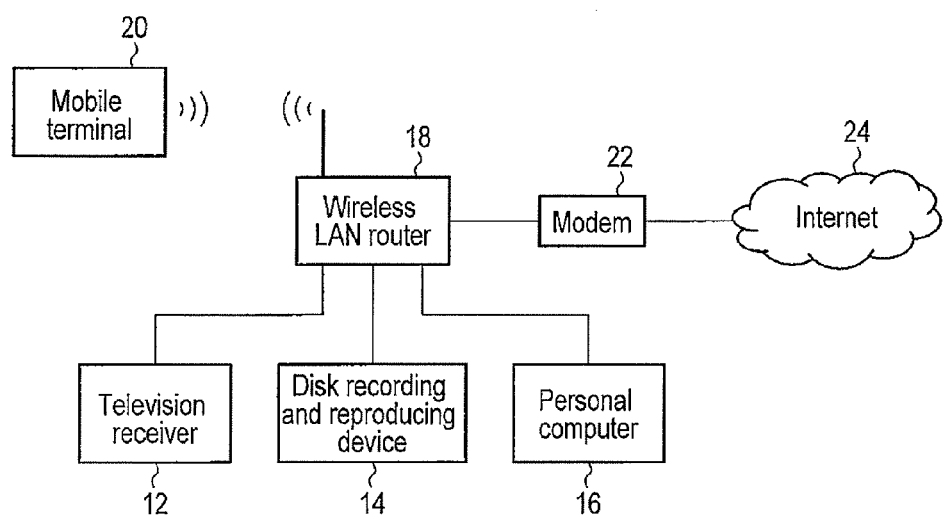
F I G. 1

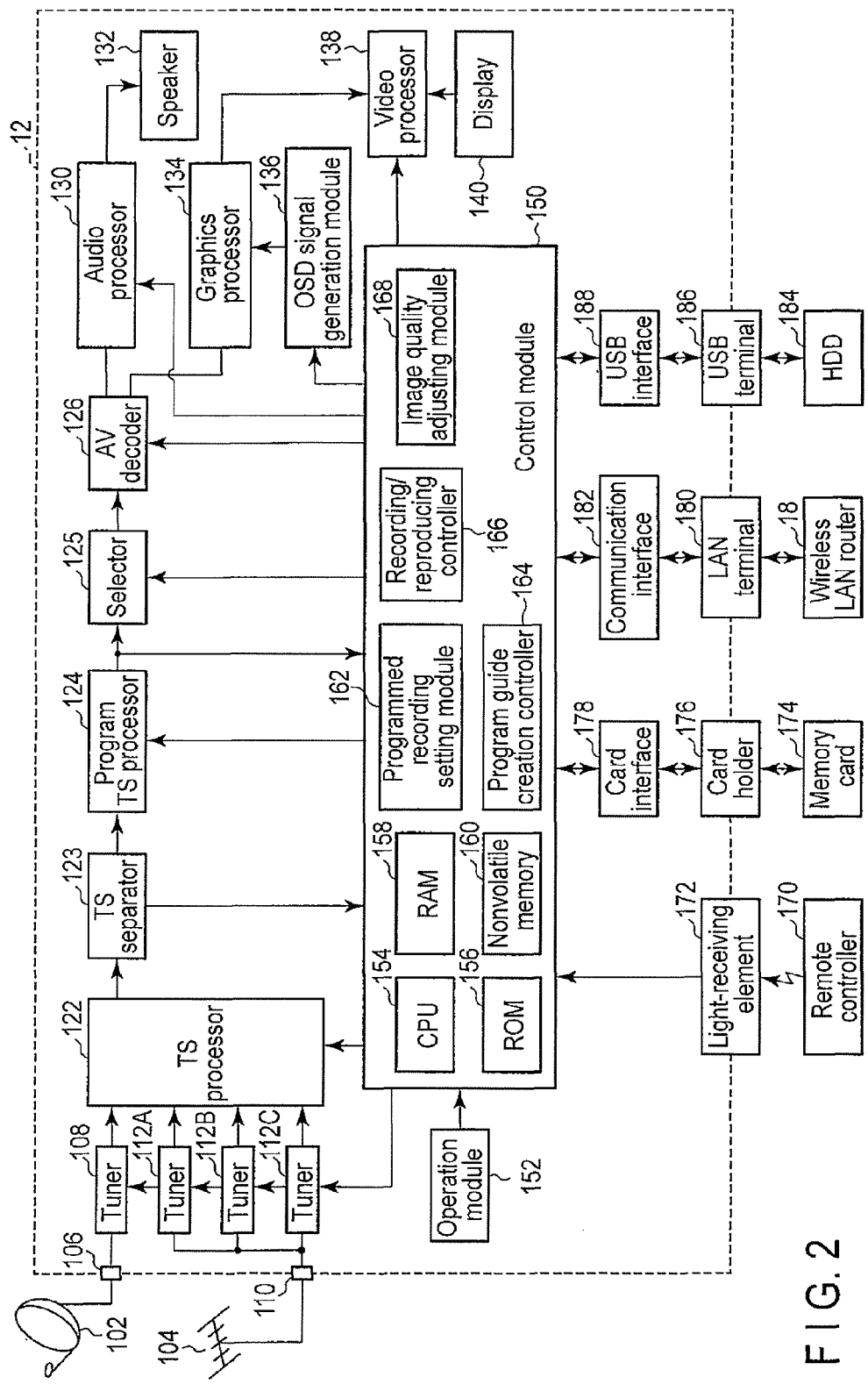
F I G. 2

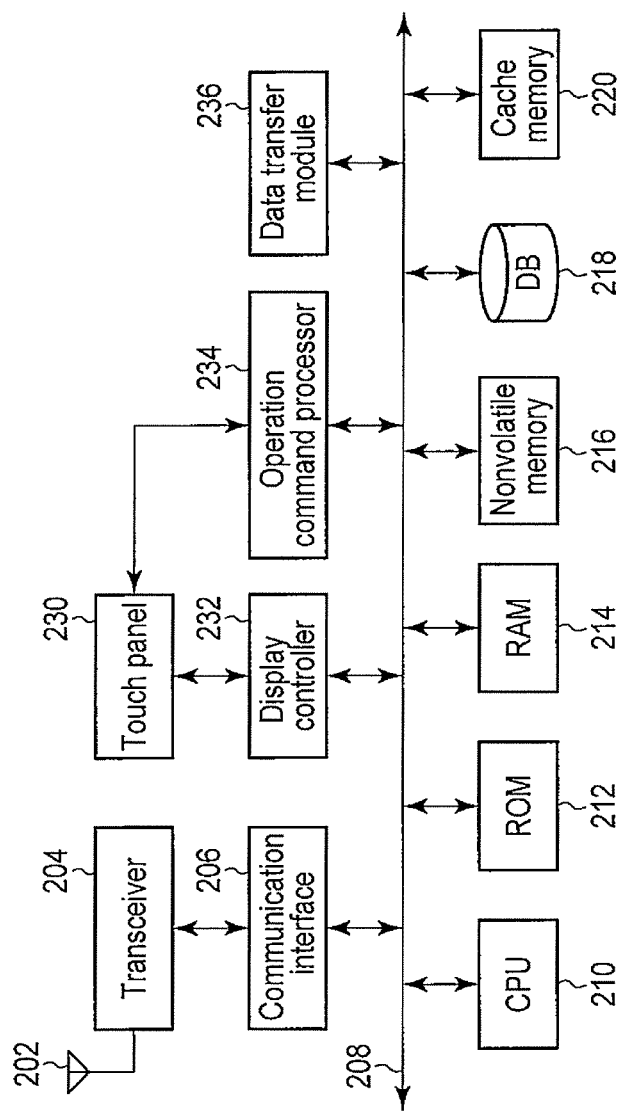
F I G. 3

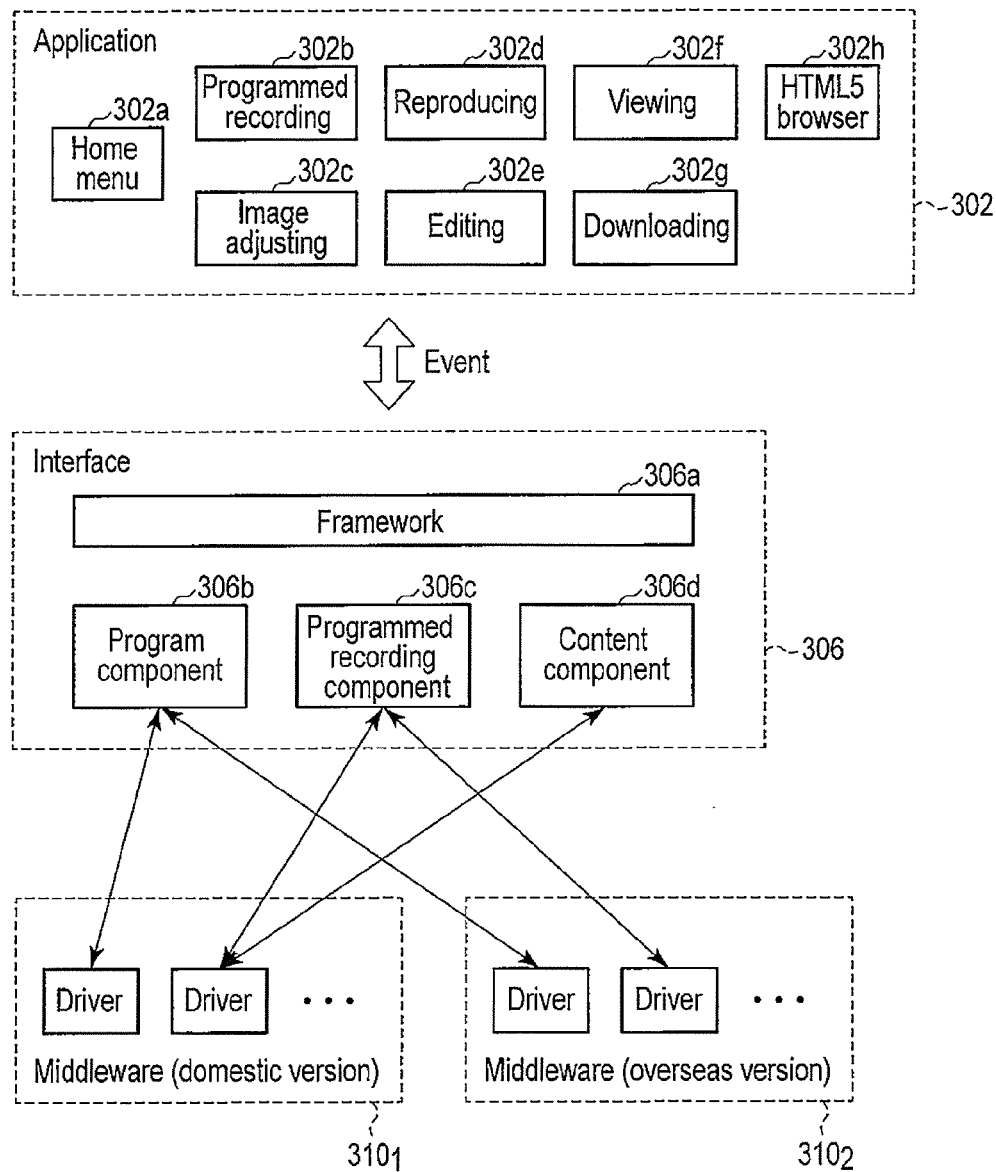
F I G. 4

INFORMATION PROCESSING SYSTEM AND INFORMATION PROCESSING METHOD

CROSS-REFERENCE TO RELATED APPLICATIONS

This application is based upon and claims the benefit of priority from prior Japanese Patent Application No. 2012-001638, filed Jan. 6, 2012, the entire contents of which are incorporated herein by reference.

FIELD

Embodiments described herein relate generally to an information processing system including an image processing device, such as a television receiver, and an information processing method.

BACKGROUND

Recent television receivers are provided with various functions. For example, they incorporate a hard disk drive or can connect with an external hard disk drive and capable of recording television programs. They display an electronic program guide (EPG) to enable the user to select a program to be recorded. The user can perform the programmed recording of a desired television program easily by selecting the program from the displayed program guide. This enables the user to record a television program even without a disk recording and reproducing device that records programs on a DVD, a BD, or the like. Although the disk recording and reproducing device is provided with various editing functions, including chapter editing, play list editing, title connection, and frame unit editing, a television receiver capable of recording often is not provided with these editing functions.

In recent years, a personal computer with a built-in tuner has enabled the user to watch and record television programs. The user can add various functions freely to the personal computer by adding software programs to the computer. Therefore, after having purchased a personal computer, the user can realize the same editing functions as those of a disk recording and reproducing device by installing video editing software.

However, with a conventional television receiver, the user cannot install software. Therefore, the user cannot add any function to the conventional television receiver after having purchased the receiver. Although some changes in the functions can be dealt with by uploading software originally provided to the receiver. To update the software, the basic configuration of the software needs to be modified. Therefore, a new function was unable to be added to the conventional television receiver flexibly.

Television receivers are required to have different functions in accordance with the particular needs of each individual country or region. Therefore, software has to be developed for each individual country or region, leading to an increase in the cost of development. In addition, even the same function may differ in graphic user interface from one country or region to another. For example, when a program guide is displayed, the horizontal axis indicates channels and the vertical axis indicates time in Japan, whereas the horizontal axis indicates time and the vertical axis indicates channels in Europe and the United States.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 shows an example of the configuration of an information processing system according to an embodiment.

FIG. 2 shows an example of the configuration of a television receiver according to the embodiment.

FIG. 3 shows an example of the configuration of a mobile terminal according to the embodiment.

FIG. 4 shows a software configuration of the information processing system according to the embodiment.

DETAILED DESCRIPTION

Figure 5:
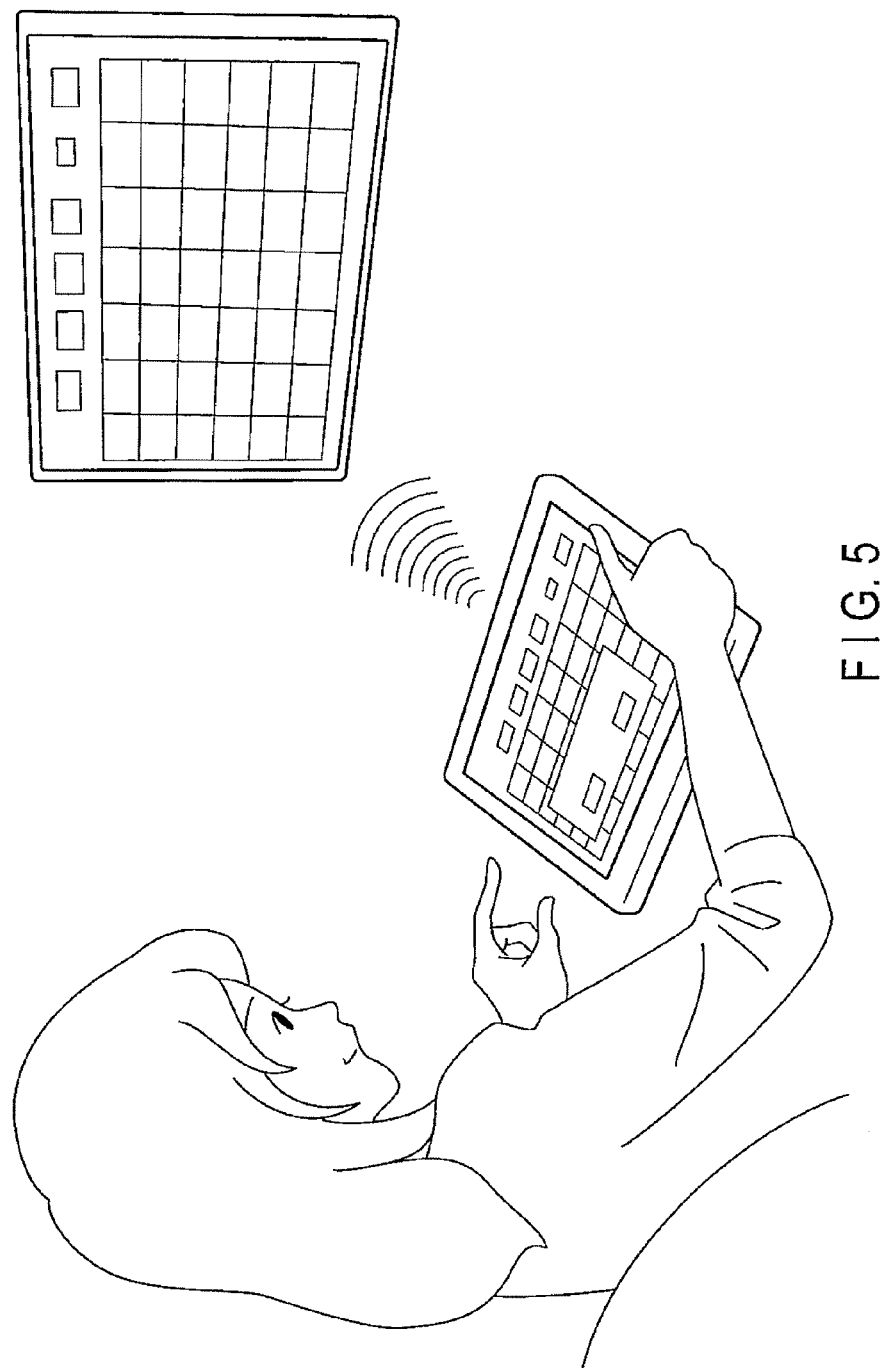
FIG. 5 shows a first example of the operation of the embodiment.

Various embodiments will be described hereinafter with reference to the accompanying drawings.

In general, according to one embodiment, an information processing system includes a television receiver, a mobile terminal, and an interface. The mobile terminal includes a controller connected wirelessly to the television receiver and configured to acquire a state signal from the television receiver and to supply a control signal to the television receiver. The interface is provided in one of the television receiver and the mobile terminal and configured to convert a first state acquisition request and a first control signal from the controller into a request and a signal which can be detected by the television receiver and to convert a second state signal from the television receiver into a state signal which can be detected by the controller.

FIG. 1 shows an overall configuration of an information processing system according to an embodiment. A television receiver 12, which is provided with a network function, is connected together with a disk recording and reproducing device 14 and a personal computer 16 to a wireless LAN router 18, thereby forming a home network. The disk recording and reproducing device 14 and personal computer 16 are not indispensable and are connected as needed.

A mobile terminal 20, such as a smartphone or a tablet computer, is connected to the wireless LAN router 18 wirelessly. This causes the mobile terminal 20 to be connected to the television receiver 12 via the home network. The mobile terminal 20 may be connected directly to the television receiver 12 by near-field communication (NFC). A personal computer, a game console, or the like may be used as the mobile terminal 20. The wireless LAN router 18 is connected to the Internet 24 via a modem 22. Although not shown, an external hard disk drive of the television receiver 12 may be connected to the wireless LAN router 18.

FIG. 2 is a block diagram of the television receiver 12. A satellite digital broadcast signal received by a BS/CS television receiving antenna 102 is supplied via an input terminal 106 to a satellite digital broadcast tuner 108, with the result that a broadcast signal on a desired channel is selected.

A terrestrial digital television broadcast signal received by a ground-based broadcast receiving antenna 104 is supplied via an input terminal 110 to terrestrial digital broadcasting tuners 112A 112B, 112C, with the result that a broadcast signal on a desired channel is selected.

A broadcast signal of pay broadcasting is encrypted. Although four tuners are shown in FIG. 2, another tuner may be added or not more than three tuners may be used. Broadcasting is not limited to radio waves propagating through the open air and may be such that programs are delivered from a broadcasting station via a cable or a network, such as an Internet Protocol (IP) network.

Broadcast program signals received by the tuners 108, 112A, 112B, 112C are input to a TS processor 122 that functions as a re-multiplex module, which re-multiplexes transport streams (TSs) on a plurality of channels (CHs) into a single TS.

TS packets on the channels are time-division multiplexed on the TS output from the TS processor 122. Therefore, for example, when packets on four channels are input, the TS processor 122 time-division multiplexes an arrangement of packets at five times the input rate and outputs a multiplexed TS. The TS processor 122 embeds a control information packet in the multiplexed TS packet arrangement. The control information packet conveys control information, including time stamp information on the multiplexed channel packets for the individual channels and packet arrangement sequence information.

A TS re-multiplexing method is not limited to a method described below. Various other TS re-multiplexing methods are possible. The TS re-multiplexed by the TS processor 122 is sent to a TS separator 123. The TS separator 123 separates a broadcast program signal into an Entitlement Control Message (ECM), encrypted information, and an Event Information Table (EIT), a table in which event information, including a program name, performers, and start time, has been written. The TS separator 123 further separates electronic program guide (EPG) data from the broadcast program signal and supplies the EPG data to a control module 150. The broadcast program TS is sent to a program TS processor 124.

All the operations of the television receiver 12, including the various receiving operations described above, are controlled by the control module 150. The control module 150, which incorporates a central processing unit (CPU) 154, receives operation information from an operation module 152 provided on the front face of a cabinet or operation information transmitted from a remote controller 170 and received by a light-receiving element 172 and controls each module so as to reflect the nature of the operation. In addition, the control module 150 receives operation information from the mobile terminal 20 supplied via the wireless LAN router 18, a LAN terminal 180, and a communication interface 182 and controls each module so as to reflect the nature of the operation. The control module 150 also supplies various state signals of the television receiver 12 to the mobile terminal 20 via the communication interface 182, LAN terminal 180, and wireless LAN router 18.

The control module 150 mainly comprises a read-only memory (ROM) 156 that stores a control program to be executed by the CPU 154, a random access memory (RAM) 158 that provides a work area to the CPU 154, a nonvolatile memory 160 in which various pieces of setting information and control information, EPG data, and the like are stored, a programmed recording setting module 162, a program guide creation controller 164, a recording/reproducing controller 166, and an image quality adjusting module 168. The program guide creation controller 164 creates an electronic program guide on the basis of a broadcast signal or EPG data previously acquired via a network or the like and displays the program guide on a screen. EPG data is normally acquired via a broadcast signal. EPG data is separated from a broadcast signal received via an antenna by controlling the tuners 108, 112A, 112B, 112C. In addition to this, EPG data may be acquired from a network via a communication interface 182 and LAN terminal 180. EPG data is stored in the nonvolatile memory 160. This enable the user to select a desired program from the electronic program guide displayed on the screen and watch the program or perform the programmed recording of the program. The programmed recording setting module 162 programs the recording or viewing of broadcast programs. The recording/reproducing controller 166 performs recording on the basis of programmed recording information in the programmed recording setting module 162, thereby performing the programmed recording of programs.

The control module 150 is connected via a card interface 178 to a card holder 176 in which a memory card (IC card) 174 can be installed. This enables the control module 150 to exchange information via the card interface 176 with the memory card 174 installed in the card holder 176. In the memory card 174, contract information on broadcast reception contracts or the like is recorded.

The control module 150 can exchange information with the disk recording and reproducing device 14, personal computer 16, and others connected to the wireless LAN router 18. In addition, the control module 150 is further connected to the Internet via the wireless LAN router 18 and modem 22.

The control module 150 is connected to a USB terminal 186 via a USB interface 188. This enables the control module 150 to exchange information via a USB interface 188 with a USB-compatible hard disk drive (HDD) 184 connected to the USB terminal 186. The hard disk drive is not limited to being externally connected to the television receiver and may be incorporated in the television receiver. A built-in hard disk drive is connected to the control module 150 via an ATA interface or the like (not shown). The number of external hard disk drives is not restricted to one. A plurality of hard disk drives may be connected. In addition, a hard disk drive may be connected through a LAN.

The program TS processor 124 decrypts program streams about pay programs. A key for decrypting is generated by the control module 150. The control module 150 generates a key using information included in the ECM, contract information on the memory card 174, and the like. Program streams about free programs are allowed to pass without decrypting.

The program TS output from the program TS processor 124 is supplied to a selector 125 and the recording/reproducing controller 166 in the control module 150. The selector 125 selects a TS of a program the user is going to watch and supplies the TS to an AV decoder 126. Video data included in video packets in the program TS has been encoded by, for example, the Moving Picture Expert Group (MPEG) method or Advanced Video Coding (AVC) method. Audio data in audio packets has been encoded by, for example, the Pulse Code Modulation (PCM) method, Dolby method, or MPEG method. The AV decoder 126 separates a program into video packets and audio packets and decodes data in each packet according to the corresponding method.

The decoded audio data is adjusted in sound volume and sound quality at an audio processor 130, which then converts the audio data into analog audio signal and supplies the analog audio signal to a speaker system 132.

The decoded video data is supplied to a graphics processor 134. The graphics processor 134 has the function of superimposing an OSD signal generated by an on-screen display (OSD) signal generation module 136 on a digital signal supplied from the AV decoder 126. In addition, the graphics processor 134 can selectively output an output video signal from the AV decoder 126 or an output OSD signal from the OSD signal generation module 134 and also combine both outputs so that each of them may constitute half the screen and output the resulting signal.

The digital video signal output from the graphics processor 134 is supplied to a video processor 138. The video processor 138 converts the input digital video signal into an analog video signal whose format enables displaying to be performed on a display 140 formed of an LCD panel, a plasma display panel, an SED panel, or the like and then outputs the resulting signal to the display 140, which displays images. The video processor 138 further adjusts picture quality, tint, display scale, line number, resolution, and others. The control module 150 supplies adjustment and control data to the audio processor 130 and video processor 138.

The recording/reproducing controller 166 can supply a program TS from the program TS processor 124 to the hard disk drive 184 via the USB terminal 186 and/or to the disk recording and reproducing device 14 via the communication interface 182, LAN terminal 180, and wireless LAN router 18. The hard disk drive 184 has a large capacity that can record several days of received broadcast programs on a plurality of channels. The disk recording and reproducing device 14 can reproduce data on a removable disk, such as a DVD or a BD, or record a signal onto such a disk. The disk recording and reproducing device 14, which is connected via a home network as shown in FIG. 1, can function as a home server.

The control module 150 includes the program guide creation controller 164. On the basis of EPG data on the past, present, and future programs, the program guide creation controller 164 can seamlessly manage a program guide about already broadcast programs stored in the hard disk drive 184, a program guide about programs now on the air, and a program guide about future programs (for about one month).

FIG. 3 is a block diagram of the mobile terminal 20. While the mobile terminal 20 will be explained as being of the tablet type that enables a touch panel operation, it may be a smartphone with a telephone function. Although not shown, the mobile terminal 20 is powered by a rechargeable battery. The mobile terminal 20 is provided with an antenna 202 for communicating with the wireless LAN router 18. The antenna 202 is connected to a system bus 208 via a transceiver 204 and a communication interface 206. Connected to the system bus 208 are a CPU 210, a ROM 212 that stores a control program to be executed by the CPU 210, a RAM 214 that provides a work area to the CPU 210, a nonvolatile memory 216 that stores various pieces of setting information, control information, and others, a database 218, and a high-speed cache memory 220. The database 218 is composed of a nonvolatile memory that stores various items of metadata, including program information. The cache memory 220 stores EPG data. Metadata and EPG data may be transferred from the television receiver 12 to the mobile terminal 20. Alternatively, the mobile terminal may download metadata and EPG data directly from the Internet 24.

The touch panel 230 functions as an image display and can operate as a touchscreen. While a display controller 232 displays a menu screen, if the user touches a desired item, the operation input is recognized by an operation command processor 234, which generates a corresponding command. For example, when a menu item button about control of the television receiver 12 is touched, a control command to the television receiver 12 is generated and supplied to the television receiver 12 via the wireless LAN router 18. This enables the television receiver 12 to be controlled by the operation of the mobile terminal 20 and the mobile terminal 20 to function as a remote controller for the television receiver 12.

The mobile terminal 20 can download, for example, content or applications via the Internet. In addition, the mobile terminal 20 can transfer the downloaded content or applications to, for example, the television receiver 12 of FIG. 1 under the control of a data transfer module 236. In this case, it appears that the mobile terminal 20 functions as a repeater. In addition, the mobile terminal 20 can request recorded programs from the television receiver 12. The mobile terminal 20 stores recorded programs sent from the television receiver in the nonvolatile memory 216. Since the data amount of recorded programs sent from the television receiver is very large, the mobile terminal 20 may not store the recorded programs and only function as a monitor. The applications downloaded via the Internet are stored in the nonvolatile memory 216.

FIG. 4 shows a software configuration of the entire system. An application 302 is connected via an interface 306 to any one of pieces of middleware $310_1$, $310_2$. The pieces of middleware are composed of drivers that control various devices and are provided on a country, region, or model basis. The application 302 and interface 306 are mounted on the mobile terminal 20. The pieces of middleware $310_1$, $310_2$ are mounted on the television receiver 12. The interface 306 may be mounted on the television receiver 12.

The application 302 includes, for example, the following applications: home menu (a menu displayed when the power supply is turned on) 302a, programmed recording 302b, image adjusting 302c, reproducing 302d, editing 302e, viewing 302f, downloading 302g, and HTML5-compatible browser 302h.

The application 302 transmits or receives asynchronous events to or from the interface 306. The events include a request issued to the pieces of middleware $310_1$, $310_2$ to acquire various states of the television receiver 12, a request issued to the pieces of middleware $310_1$, $310_2$ to operate and control the television receiver 12, and a notice of change of state of the television receiver 12 received from the pieces of middleware $310_1$, $310_2$. The request to acquire various states of the television receiver 12 includes, for example, (1) a content (broadcast programs and downloaded content being generically called content) list acquisition request (the request including an acquisition range and a return being a content index), (2) a thumbnail acquisition request (the request including a content index and a return being image data [thumbnail images]), (3) a program guide information acquisition request (the request including an acquisition range (including time and date) and a return being program guide information), (4) a program help information acquisition request (the request including a program index and a return being program help information), (5) a programmed recording list acquisition request (the request including an acquisition range (including time and date) and a return being programmed recording information). The request to operate and control the television receiver 12 includes, for example, (1) content search (a return being a search result index), (2) content reproduction (including reproduction information [including position]), (3) the stopping of content being reproduced, (4) tuning (including channel tuning), (5) entry of programmed recording (including a program index). The notice of change of state of the television receiver 12 has state variables as parameters.

The interface 306 includes a component for each function that commonly controls each device of the television receiver 12 by using each driver of the pieces of middleware $310_1$, $310_2$. A component is created as a highly versatile program called a library. The components for the individual functions include, for example, a program component 306b for displaying a program guide, a programmed recording component 306c for performing programmed recording, and a content component 306d for adjusting images. The components absorb the difference in the pieces of middleware $310_1$, $310_2$ between countries, regions, or models. That is, each component of the interface 306 has the function for converting a television receiver state acquisition request and a control signal to the television receiver transmitted from the application 302 into a request and a control signal each of the pieces of middleware $310_1$, $310_2$ can decode and further converting a notice of change of the state of the television receiver 12 transmitted from each of the pieces of middleware $310_1$, $310_2$ into information the application 302 can decode. This makes it unnecessary to develop various applications 302a to 302h according to countries, regions, or models even if the pieces of middleware $310_1$, $310_2$ have been developed according to countries, regions, or models. The various applications 302a to 302h are downloaded to the mobile terminal 20 via the Internet and stored in the nonvolatile memory 216. Therefore, only installing applications in the mobile terminal 20 enables a new function to be added to the television receiver 12 without modifying the television receiver 12 at all.

An example of the operation of an application of the embodiment will be explained with reference to FIGS. 5 to 8. An explanation will be given about a case where, when the user performs a touch operation on the touch panel 230 of the mobile terminal 20, the operation result is transmitted to the television receiver 12 and then the television receiver 12 is controlled. For example, a home menu application 302a activated when the power supply is turned on displays a home menu, an application selection screen, on the touch panel of the mobile terminal 20. When the user touches an icon of an application of the remote controller (not shown in FIG. 4) on the home menu, a menu screen similar to a button of the remote controller 170 is displayed on the touch panel 230 of the mobile terminal 20. A screen display is executed by a browser application 302h. The user specifies a point corresponding to a specific item on the menu displayed on the touch panel 230. A command (e.g., power on, channel switching, or turning up/down the volume) according to the coordinates of the specified point is transmitted to the television receiver 12. The controller 15 performs a specific operation. This causes the mobile terminal 20 to function as a remote controller of the television receiver 12. Since the mobile terminal 20 includes the touch panel 230, the user can operate the mobile terminal 20 easier than the remote controller on which the user performs a button operation. In addition, the mobile terminal 20 can provide the user with a user interface that can deal with various complicated control operations.

FIG. 5 shows an example of the operation of the programmed recording application 302b. Previously, a program was selected by a button operation on a remote controller. Therefore, it took time and labor to program the recording of a broadcast program. When the programmed recording application 302b is selected from the home menu on the touch panel 230, an electronic program guide is displayed on the touch panel 230. To display a program guide, the mobile terminal 20 transmits a program guide information acquisition request (specifying an acquisition range [including time and date]) and a program help acquisition request (specifying a program index) to the television receiver 12. Program guide information and program help information sent back from the television receiver 12 are stored in the cache memory 20 and database 218, respectively. On the basis of the stored data, an electronic program guide is displayed. When the mobile terminal 20 is used in front of the screen of the television receiver 12, the electronic program guide may be transferred to the television receiver 12 and displayed at the same time. When the mobile terminal 20 is used at a point distant from the television receiver 12, there is no need to transfer the electronic program guide to the television receiver 12 and display the guide there.

Since the user can operate (e.g., turn over pages of) the electronic program guide on the touch panel 230 of the mobile terminal 20 in the user's own hands with fingers, the user can select a desired program quickly (by a touch operation). When a program has been selected, the message "Do you want to perform programmed recording of this program?" is displayed. When the user selects "Yes," the index of the selected program is transferred to the television receiver 12 and recording is programmed at the programming setting module 162. In addition to turning over the program guide to select a program, a key word may be input to search for a program including the keyword and the program may be selected from the search result.

The viewing application 302f is a similar user interface to the programmed recording application 302b and operates in a similar manner.

Figure 6:
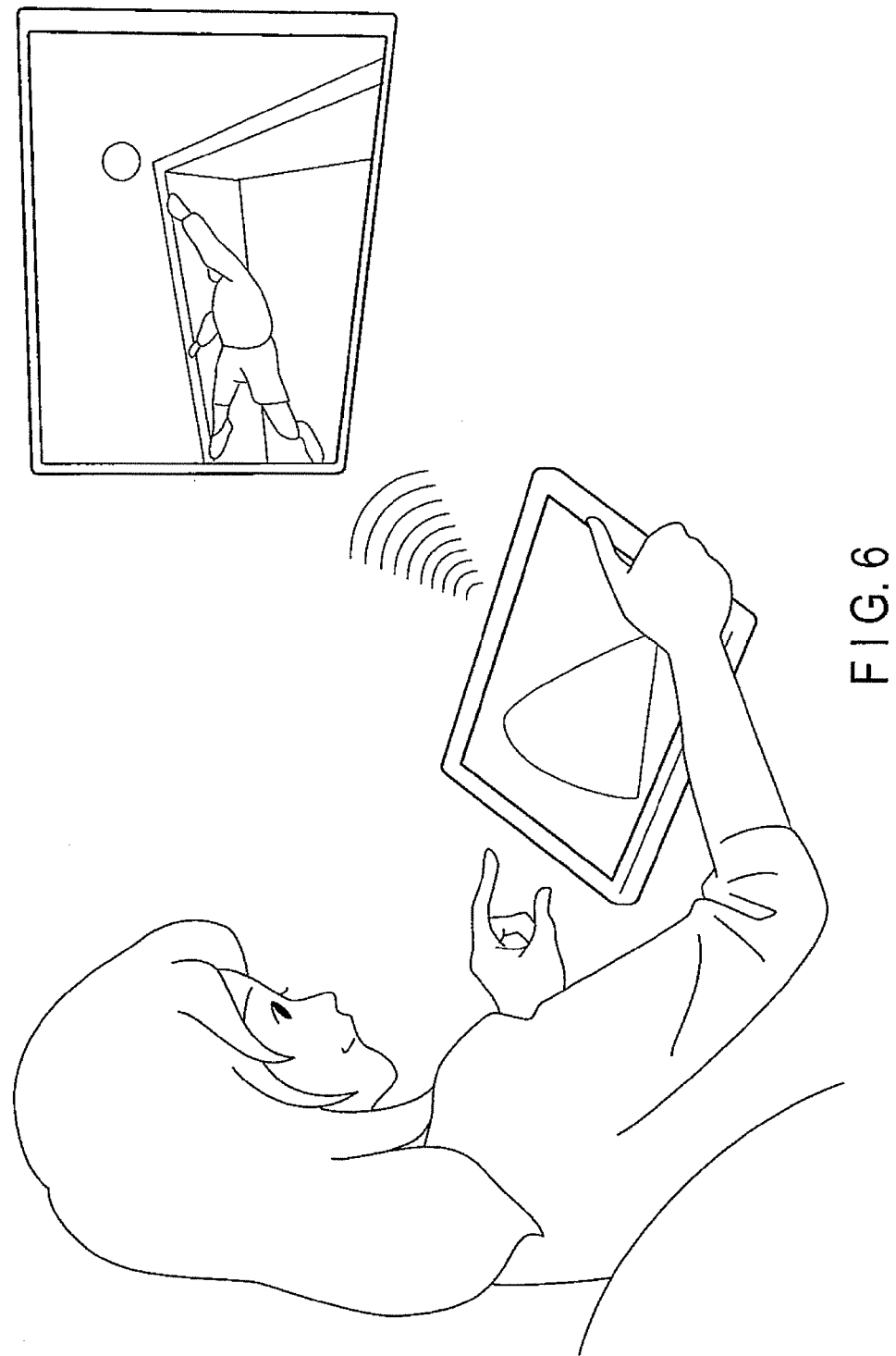
FIG. 6 shows a second example of the operation of the embodiment.

FIG. 6 shows an example of the operation of the image adjusting application 302c. A conventional image adjustment was complicated. Image setting was selected from a menu on the television receiver 12 and the value of each parameter was adjusted (or increased or decreased). After all the parameters had been set, control was returned to image display. Since no image was displayed in the course of adjusting parameters, the values of parameters were adjusted by trial and error. Therefore, it took time and labor to adjust images. However, with the embodiment, while the television receiver 12 is displaying images, when the image adjusting application 302c is selected from the home menu on the touch panel 230, a brightness and color adjusting screen, for example, a CIExy chromaticity diagram, is displayed with the displayed image on the television receiver 12 remaining unchanged. An image displayed on the television receiver 12 may be a broadcast program currently being watched, a recorded program stored on the hard disk drive 184, or downloaded content.

While viewing an image currently being displayed on the television receiver 12, the user specifies a point corresponding to a desired color on the chromaticity diagram displayed on the touch panel 230 (by a touch operation). Information on a color on a CIExy system corresponding to the coordinates of the specified point is transmitted to the television receiver 12. Then, the control module 150 and image processor 138 adjust the picture quality of the image. The above operations are repeated until a desired image quality is obtained. The adjusted value is reflected immediately in the image, enabling the image to be adjusted to a desired image quality very easily.

Image adjustment is not limited to color and brightness. The resolution of an image may be adjusted. In addition, not only images but also sound may be adjusted in terms of sound quality and sound volume. Adjustment data items, including various adjustment levels, may be stored in the nonvolatile memory 216 and further used in the next adjustment. The adjustment data items may be given to one other television receiver the use of which has been entered in the mobile terminal. As a result, for example, if the optimum image quality adjusted value for a movie has been stored, when the user watches the same movie on the one other television receiver, it is possible to reproduce the optimum image quality easily on the basis of the stored adjustment data without making a new image quality adjustment.

Figure 7:
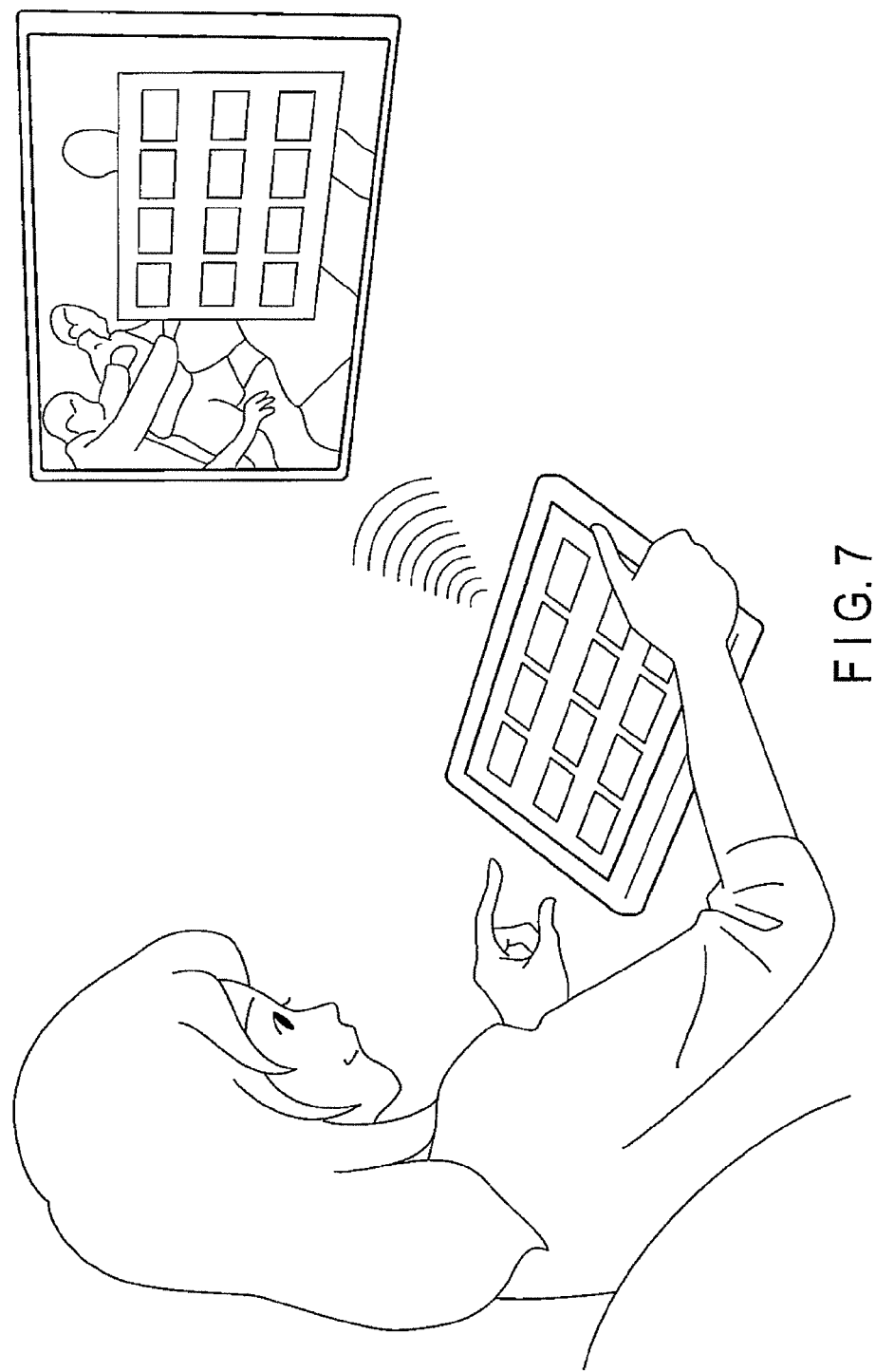
FIG. 7 shows a third example of the operation of the embodiment.

FIG. 7 shows an example of the operation of the reproducing application 302d. When the reproducing application 302d is selected from the home menu on the touch panel 230, the mobile terminal 20 transmits a content list acquisition request (specifying an acquisition range) and a thumbnail acquisition request (specifying a content index) to the television receiver 12. A content index and a thumbnail image sent back from the television receiver 12 are stored in the cache memory 20. On the basis of these storage data items, a list of recording content is displayed on the touch panel 230. The list of recording content may be transferred to and displayed on the television receiver 12 or may not be transferred.

Since the user can operate (e.g., turn the pages of) by finger the list of recording content on the touch panel 230 of the mobile terminal 20 in the user's own hands, the user can select desired content quickly (by a touch operation). When content has been selected, a selected content reproducing request (specifying reproduction information (position) or the like) is transferred to the television receiver 12. The selected content starts to be reproduced. Reproducing is performed on the display 140 of the television receiver 12 and/or the touch panel 230 of the mobile terminal 20. In addition to turning over the list to select content to be reproduced, a keyword may be input to search for content including the keyword and the content to be reproduced may be selected from the search result.

Figure 8:
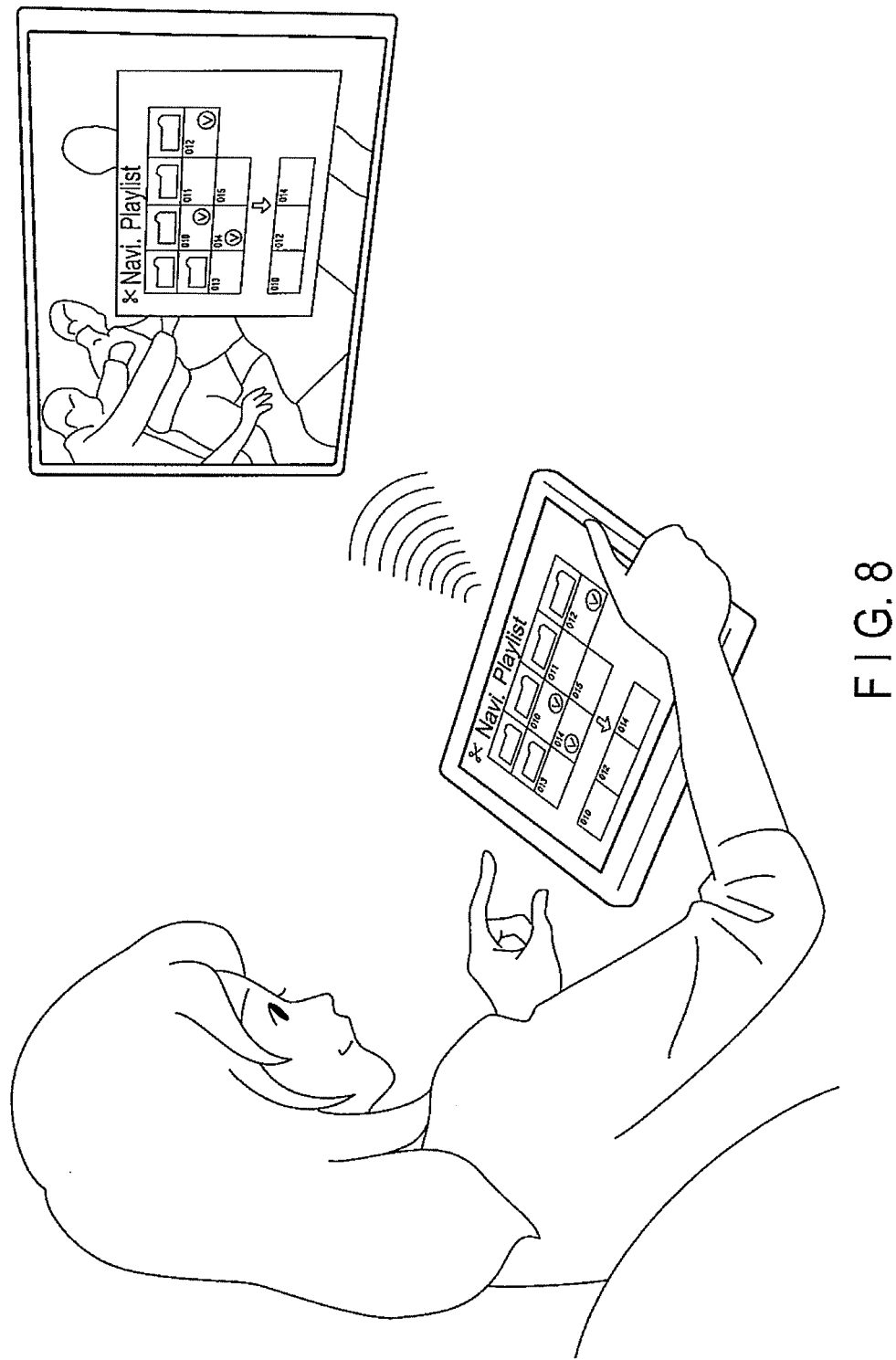
FIG. 8 shows a fourth example of the operation of the embodiment.

FIG. 8 shows an example of the operation of the editing application 302e. When the editing application 302e is selected from the home menu on the touch panel 230, an edit menu is displayed on the touch panel 230. The edit menu may be transferred to and displayed on the television receiver 12 or may not be transferred. The edit menu includes thumbnail setting, title connection, chapter editing, playlist editing, and others. When playlist editing is selected, the mobile terminal 20 requests a list of recorded programs (thumbnail images) in the hard disk 184 from the television receiver 12. When a folder is selected, a list of files in the folder is displayed. When a file is selected, the mobile terminal 20 sends a request for the acquisition of a thumbnail image of chapters of the file and time information (the start times and end times of the chapters) to the television receiver 12. Here, suppose the television receiver 12 has the function of automatically dividing a program into chapters in recording the program. However, when the television receiver 12 transfers a program (a file) to the mobile terminal 20, the chapter may be divided on the mobile terminal 20. On the basis of the thumbnail image and time information transmitted from the television receiver 12, the mobile terminal 20 displays a list of chapters in the selected file in the selected folder in the recorded programs in the hard disk 184 on the touch panel 230 as shown in FIG. 8.

Since the user can operate (e.g., turn over pages of) the list of chapters on the touch panel 230 of the mobile terminal 20 in the user's own hands with fingers, the user can select a desired chapter quickly (by a touch operation). The selected chapter is placed in a desired position of the playlist. While chapters in another file are being displayed as needed, the above operations are repeated, thereby editing the playlist. As described above, just selecting a chapter at hand enables a playlist to be created easily. New content is created by copying the playlist.

Next, an example of the operation of the downloading application 302g will be explained. When the downloading application 302g is selected from the home menu on the touch panel 230, a list of content as shown in FIG. 7 is displayed on the touch panel 230. The list of content may be transferred to and displayed on the television receiver 12 or may not be transferred.

Since the user can operate (e.g., turn the pages of) by finger the list of content on the touch panel 230 of the mobile terminal 20 in the user's own hands, the user can select desired content quickly (by a touch operation). When content is selected, an index of the selected content is transferred to the television receiver 12. The television receiver 12 transfers the selected content to the mobile terminal 20. The mobile terminal 20 stores the content sent from the television receiver 12 in the nonvolatile memory 216. As a result, the user can store the stored content of the television receiver 12 in the mobile terminal 20 and access the content to reproduce it in an arbitrary place.

At the time of download, the image quality may be changed. After content stored with the HD image quality in the television receiver 12 is downloaded to the mobile terminal 20, it may be converted into that with SD image quality to reduce the data size and stored in the mobile terminal 20.

In addition, when a recorded program download request is issued while the television receiver 12 is performing another process (e.g., recording), downloading cannot be performed. However, since the television receiver 12 does not have the function of sending an alarm message to the mobile terminal 20 in such a case, why downloading cannot be performed is unknown to the mobile terminal 20. To cope with this, a programmed recording list created by the programmed recording application at the mobile terminal 20 is stored in the nonvolatile memory 216. When the television receiver 12 is not recording, a download request is automatically issued. This enables the television receiver 12 to avoid the problem of being unable to perform a process due to repeated requests without any modification. Although another process has been given priority over a recorded program download request, control may be performed in such a manner that another process is interrupted and a recorded program download request is given priority.

While content to be downloaded is selected and downloaded one item at a time with the mobile terminal 20, a plurality of content may be selected and downloaded en bloc from the television receiver 12 to the mobile terminal 20. Alternatively, content specified at the time of programmed recording may be automatically downloaded when the connection of the mobile terminal 20 to the wireless LAN router 18 has been recognized.

As described above, with the embodiment, installing applications in the mobile terminal 20 different from the television receiver 12 enables the user to add a function after the purchase of the television receiver 12. Since various pieces of state information (including a programmed recording list and a recording content list) on the television receiver, information necessary for applications to perform control are acquired by the application side issuing an acquisition request, the mobile terminal 20 different from the television receiver 12 can control the television receiver 12. An interface that converts a signal, a request, or the like is caused to intervene between an application and middleware, making it unnecessary to modify the application even if the middleware differs. As a result, use of a common application enables a new function to be added to a television receiver differing from one country, region, or model to another.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:
    a television receiver comprising a second controller configured to control devices in the television receiver, the second controller containing functions according to a country or region in which the television receiver is to be sold; and
    a mobile terminal comprising
        (1) a first controller configured to (i) connect wirelessly to the television receiver (ii) acquire a state signal from the television receiver and (iii) supply a control signal to the television receiver, and
        (2) an interface configured to convert (a) a first state acquisition request from the first controller into a second state acquisition request, (b) a first control signal from the first controller into a second control signal which can be detected by the second controller and, (c) the state signal from the television receiver into a state signal which can be detected by the first controller.

2. The system of claim 1, wherein the mobile terminal comprises:
    a touch panel configured to display a programmed recording screen; and a transmission module configured to transmit program information on a program selected on a programmed recording screen on the touch panel to the television receiver, and
    the television receiver comprises a module configured to program recording of a program based on the program information transmitted from the transmission module.

3. The system of claim 1, wherein the mobile terminal comprises:
    a touch panel configured to display an image quality adjusting screen that adjusts an image quality of an image displayed on the television receiver; and
    a transmission module configured to transmit adjustment information on the image quality set on the image quality adjusting screen on the touch panel, and
    the television receiver comprises a module configured to adjust the image quality of an image based on adjustment information transmitted from the transmission module.

4. The system of claim 1, wherein the television receiver comprises a recording module, the mobile terminal comprises:
    a touch panel configured to display a list of recorded programs; and
    a transmission module configured to transmit index information on a program selected from the list of images on the touch panel to the television receiver, and
    the television receiver further comprises a module configured to reproduce a recorded program based on the index information transmitted from the transmission module.

5. The system of claim 1, wherein the television receiver comprises a recording module, the mobile terminal comprises:
    a touch panel configured to display an edit screen for a recorded program; and
    a transmission module configured to transmit edit information selected on the edit screen on the touch panel to the television receiver, and
    the television receiver further comprises an edit module configured to edit a recorded program based on the edit information transmitted from the transmission module.

6. The system of claim 5, further comprising a module configured to copy a recorded program edited by the edit module onto a portable storage medium.

7. The system of claim 1, wherein the television receiver comprises a recording module the mobile terminal comprises:
    a touch panel configured to display a list of recorded programs; and
    a first transmission module configured to transmit index information on a program selected from the list on the touch panel to the television receiver,
    the television receiver further comprises a second transmission module configured to transmit a recorded program to the mobile terminal based on the index information transmitted by the first transmission module, and
    the mobile terminal further comprises a module configured to record an image of a recorded program transmitted by the second transmission module.

8. An information processing method for an information processing system comprising a television receiver and, the method comprising: a mobile terminal, the mobile terminal comprising (i) a first controller configured to (1) connect wirelessly to the television receiver, (2) acquire a second state signal from the television receiver and (3) supply a control signal to the television receiver, wherein the television receiver comprises a second controller configured to control devices in the television receiver, the second controller containing functions according to a country or region in which the television receiver is to be sold, and (ii) an interface including a component for each function contained on the second controller, wherein each component provides the interface with the ability to absorb a difference in versions between countries or regions for one of the functions the method comprising:
    converting, by the interface, a first state acquisition request and a first control signal from the first controller into a state acquisition request and a control signal which can be detected by the second controller; and
    converting, by the interface, the second state signal from the television receiver into a first state signal which can be detected by the first controller.

9. The method of claim 8, further comprising:
    transmitting program information on a program selected on a programmed recording screen on a touch panel of the mobile terminal to the television receiver; and
    programming recording of a program based on the program information transmitted from the mobile terminal.

10. The method of claim 9, further comprising:
    transmitting adjustment information on an image quality set on an image quality adjusting screen on a touch panel of the mobile terminal; and
    adjusting an image quality of an image based on the adjustment information transmitted from the mobile terminal.

11. The method of claim 9, further comprising:
    transmitting index information on a program selected from a list of images on a touch panel of the mobile terminal to the television receiver; and
    reproducing a recorded program based on the index information transmitted from the mobile terminal.

12. The method of claim 9, further comprising:
    transmitting edit information selected on an edit screen on a touch panel of the mobile terminal to the television receiver; and editing a recorded program based on the edit information transmitted from the mobile terminal.

13. The method of claim 9, further comprising:
copying a recorded program edited by the editing module onto a portable storage medium.

14. A non-transitory computer-readable storage medium having stored thereon a computer program which is executable by a computer for an information processing system comprising a television receiver and a mobile terminal, the mobile terminal comprising a first controller configured to (1) connect wirelessly to the television receiver, (2) acquire a second state signal from the television receiver and (3) supply a control signal to the television receiver, wherein the television receiver comprises a second controller configured to control devices in the television receiver, the second controller contains functions according to a country or region in which the television receiver is to be sold, the computer program comprising instructions capable of causing the computer to execute functions of:
  converting a first state acquisition request from the first controller into a second state acquisition request which can be detected by the second controller and a first control signal from the first controller into a second control signal which can be detected by the second controller; and
  converting the second state signal from the television receiver into a first state signal which can be detected by the first controller.

15. The system of claim 1, wherein the second controller comprises a middleware program comprising drivers configured to control the devices of the television receiver, and the interface comprises a library program configured to provide common control over the devices.

16. A mobile terminal wirelessly connected to a television receiver, the television receiver comprising a second controller configured to control devices in the television receiver, the second controller containing functions according to a country or region in which the television receiver is to be sold, the mobile terminal comprising:
  a first controller configured to receive a state signal from the television receiver and to supply a control signal to the television receiver; and
  an interface configured to convert (i) a state acquisition request from the first controller into a state acquisition request which can be detected by the second controller, (ii) a control signal from the first controller into a control signal which can be detected by the second controller, and (iii) a state signal from the television receiver into a state signal which can be detected by the first controller, the interface includes a component for each function contained on the second controller, wherein each component provides the interface the ability to absorb a difference in versions between countries or regions for one of the functions.

17. The mobile terminal of claim 16 further comprises:
a processor; and
a storage device communicatively coupled to the processor, the storage device comprises the first controller and the interface.

18. The information processing system of claim 1, wherein each component provides the interface with the ability to absorb a difference in versions between countries or regions for one of the functions.

19. The information processing system of claim 1, wherein the mobile terminal further comprises
a processor; and
a storage device communicatively coupled to the processor, the storage device comprises the first controller and the interface.

20. A television receiver wirelessly connected to a mobile terminal, the mobile terminal comprises (1) a first controller configured to output a first state acquisition request in a first format and a first control signal in the first format, and (2) an interface configured to convert the first state acquisition request into a second state acquisition request in a second format and the first control signal into a second control signal in a second format, the television receiver comprising:
  a second controller configured to control devices in the television receiver, wherein the second controller is based on a country or region in which the television receiver is to be sold,
  wherein the second controller is configured to (i) receive the second state acquisition request and the second control signal from the mobile terminal and (ii) output a second state signal in the second format to the mobile terminal, wherein the second controller contains functions according to a country or region in which the television receiver is to be sold.

* * * * *